United States Patent [19]

Shufflebarger et al.

[11] 4,028,254
[45] June 7, 1977

[54] FLUID FILTER

[75] Inventors: Earl D. Shufflebarger, Mentor; Edward E. Kish, Kirtland; John R. Boylan; George D. Diehl, both of Euclid; Bernard J. Gallagher, Mayfield; William P. Tobbe, Lyndhurst, all of Ohio

[73] Assignee: Nupro Company, Willoughby, Ohio

[22] Filed: Oct. 14, 1975

[21] Appl. No.: 622,032

[52] U.S. Cl. .................... 210/447; 55/498; 55/DIG. 31; 210/448; 210/450; 210/452

[51] Int. Cl.² .................. B01D 27/08

[58] Field of Search .......... 210/232, 350, 352, 447, 210/448, 450, 451, 452, 454; 55/498, 504, DIG. 31

[56] References Cited
UNITED STATES PATENTS

| 2,382,278 | 8/1945 | Widmann | 210/232 X |
| 3,240,342 | 3/1966 | Callahan, Jr. et al. | 210/496 X |
| 3,240,346 | 3/1966 | Callahan, Jr. et al. | 210/496 X |
| 3,458,050 | 7/1969 | Copper | 210/448 |
| 3,552,552 | 1/1971 | Johnston | 210/447 |

Primary Examiner—Frank W. Lutter
Assistant Examiner—William A. Cuchlinski, Jr.
Attorney, Agent, or Firm—Fay & Sharpe

[57] ABSTRACT

A fluid filter including a filter body having inlet and outlet passages communicating with an open ended chamber on opposite sides of a tapered seat area. A cupshaped fluid filter or strainer element is located in the chamber through the open end thereof and is adapted to be closely received in the seat area. A bonnet assembly covers the open end of the chamber, is threadedly mounted to the body and is comprised of a bonnet, a bonnet nut and biasing means. The biasing means is employed to exert a biasing force against the filter or strainer element to continuously urge it toward the seat area. At least the bonnet and bonnet nut are themselves interconnected in a manner that permits both rotational and limited axial movement therebetween. The disclosed structure facilitates access to the chamber and filter or strainer element without the necessity for removing the entire fluid filter structure from a service installation. The interconnection between at least the bonnet and bonnet nut permits the bonnet assembly to be removed from the filter body as a single unit and the tapered seat area is configured such that the filter or strainer element is thereby retained in the chamber when the bonnet assembly is removed from the body for subsequent separate removal therefrom by hand.

25 Claims, 5 Drawing Figures

FLUID FILTER

BACKGROUND OF THE INVENTION

This invention pertains to the art of filters and strainers and more particularly to fluid filter arrangements. As used hereinafter, filter generally refers to any media used for removing particulate matter from a fluid. Some of these mediums are commonly referred to as filters while others are referred to as strainers; the difference between them is a matter of degree as to porosity and the size of the particles which will be prevented from passing therethrough. As used herein, filter is deemed to include both filters and strainers.

The invention is particularly applicable to a liquid filter which receives a filter or strainer element therein and will be described with particular reference thereto; however, it will be appreciated by those skilled in the art that the invention has broader applications and may be employed in other environments.

While any number of types and styles of filter structures of this general type have been previously developed, they all have had certain problems which created difficulty in effectively implementing their use in the field. For example, some have been of the type generally termed as inline filters. In such arrangements, a filter body includes a fluid inlet passage at one end and a fluid outlet passage at the other end with a fluid filter element disposed in a fluid chamber defined between the inlet and outlet. Typically, such filters include means for allowing them to be disassembled in order to gain access to the fluid chamber for purposes of changing or cleaning the filter element. However, disassembly of such prior structures have required that virtually the entire filter structure may be removed from an installation. When such removal is required, additional time for the maintenance operation is necessitated. Furthermore, these structures require that the overall installation be undesirably disturbed.

Other types of filter arrangements have also been previously developed and one of these may be generally referred to as a T-type filter. In such a filter, the filter element is received in a chamber disposed generally normal to the filter inlet and outlet passages. Typically, the chamber includes an end cap releasably received thereover in order to retain the filter element in the chamber. While this type of prior structure eliminates the problem of having to remove the entire filter structure from an installation for servicing, they do have other disadvantages. For example, once this type of filter arrangement has been installed into practical application and it becomes necessary to gain access to the chamber for servicing the filter element, efficient disassembly was often extremely difficult due to the number of individual components such as bonnets, bonnet nuts, sealing rings, sealing washers and the like involved.

Inasmuch as filter installation are oftentimes located in out of the way places which are difficult for service personnel access, it is very easy to lose one or more of the components during the disassembly or reassembly process. Such losses necessitate additional maintenance and repair time which could be otherwise effectively utilized. In addition, most prior structures of the T-filter type were designed for use with a particular type of filter element or a particular type of strainer element. Thus, it has been necessary to purchase and/or stock separate filter structures and/or elements depending upon the particular degree of filtering required for the fluid being processed. Such requirements have necessitated increased inventories with resultant increased costs.

The present invention contemplates a new and improved structure which overcomes all of the above referred to problems and others and provides a new fluid filter which is relatively simple in design, employs a minimum of separate component parts, may be readily employed in any number of different fluid environments including corrosive, abrasive, high temperature and low temperature environments, and which is adapted for use with different types of filters.

BRIEF DESCRIPTION OF THE INVENTION

In accordance with the present invention, a fluid filter is provided which comprises a filter body including a fluid chamber therein having an open outer end with a seat area disposed axially therealong. A fluid inlet passage communicates with the chamber on one side of the seat area and a fluid outlet passage communicates with the chamber on the other side of the seat area. A fluid filter element is positioned in the chamber with one end thereof received in the seat area. A bonnet assembly is employed to close the open end of the chamber and is releasably retained on the filter body. The bonnet assembly includes a bonnet and a bonnet nut interconnected with each other so as to permit relative rotational and limited axial movement therebetween. Biasing means are provided for continuously urging the filter element toward the seat area and sealing means are also provided for sealing the interconnection between the bonnet assembly and the filter body.

In accordance with another aspect of the present invention, the bonnet nut is generally cup-shaped and includes a top wall having an opening therethrough. The bonnet is slidably received in the cup-shaped bonnet nut with a portion thereof extending through the opening. The bonnet is retained in the position by means which permit relative rotational and limited axial movement between the two components. The bonnet assembly is releasably retained on the filter body by means of threaded engagement between the two.

In accordance with a further aspect of the present invention, the urging means comprises a spring biasing means having one end affixed to the bonnet assembly with the other end adapted to engage the filter element for continuously urging it toward the seat area. The bonnet, bonnet nut and spring biasing means may be removed from the filter body as a single unit.

In accordance with still another aspect of the present invention, the urging means comprises a resilient member disposed between the bonnet and filter element.

In accordance with yet a further aspect of the present invention, the seat area is comprised of a tapered area in the chamber which tapers outwardly from that end thereof disposed closest to the open outer end of the chamber. The seat area may be employed to closely received the filter element and retain it in the chamber.

In accordance with yet another aspect of the present invention, the bonnet assembly includes a by-pass port which communicates with the chamber.

The principal object of the present invention is the new and improved fluid filter.

Another object of the present invention is the provision of a new and improved fluid filter which may be used in a wide variety of fluid environments and applications.

Still another object of the present invention is the provision of a new and improved fluid filter which may be used over a wide range of high and low temperatures.

Still a further object of the present invention is the provision of a new and improved fluid filter which is readily adaptable for use with different types of fluid filter and strainer element constructions.

BRIEF DESCRIPTION OF THE DRAWINGS

The invention may take physical form in certain parts and arrangements of parts, the preferred embodiment of which will be described in detail in the specification and illustrated in the accompanying drawings which form a part hereof and wherein.

DESCRIPTION OF THE PREFERRED EMBODIMENT

Figure 1:
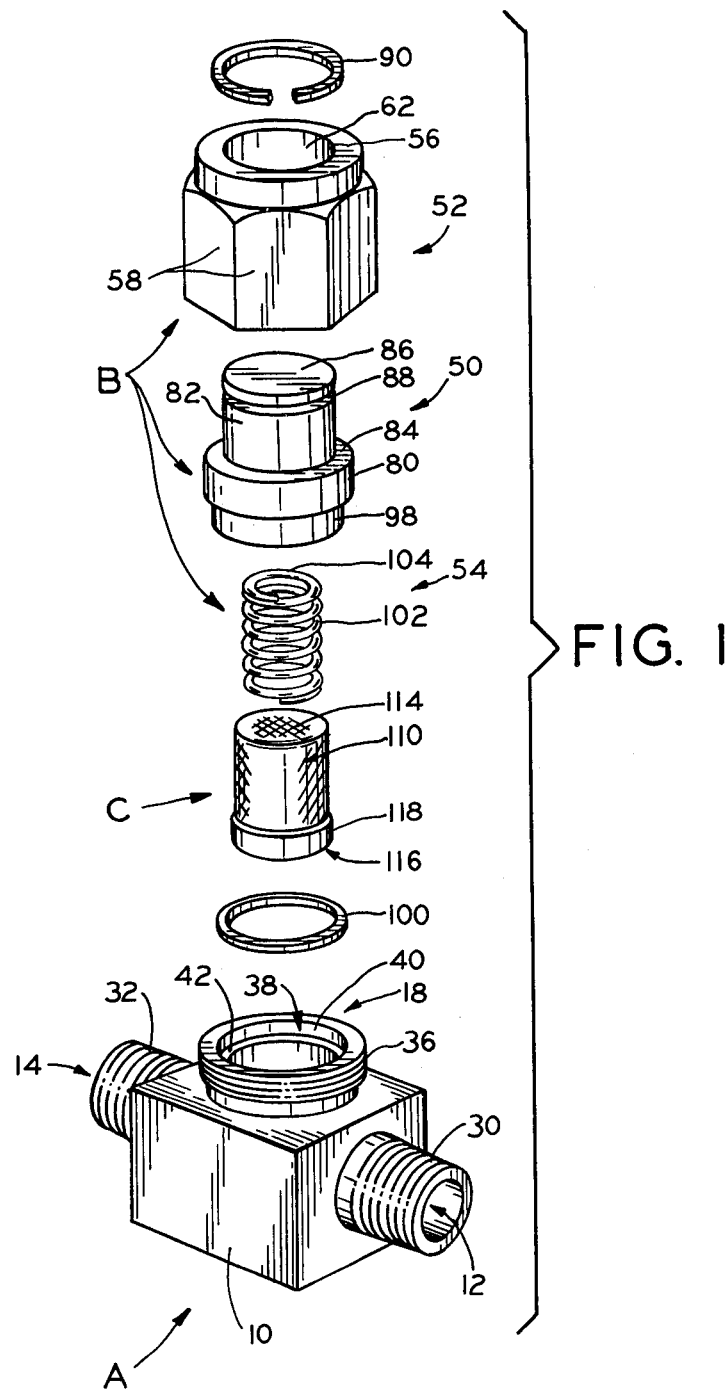
FIG. 1 is an exploded perspective view showing the fluid filter of the subject invention.

Referring now to the drawings wherein the showings are for purposes of illustrating the preferred embodiment of the invention only and not for purposes of limiting same, the Figures show a fluid filter comprised of a filter body A and a bonnet assembly B along with a filter element or assembly C. Again, and as used hereinafter, filter and filter element generally refer to any media employed for removing particulate matter from a fluid. Some of these are more commonly referred to as filters while others are more commonly referred to as strainers. As used herein, filter is deemed to apply to both filters and strainers.

Figure 2:
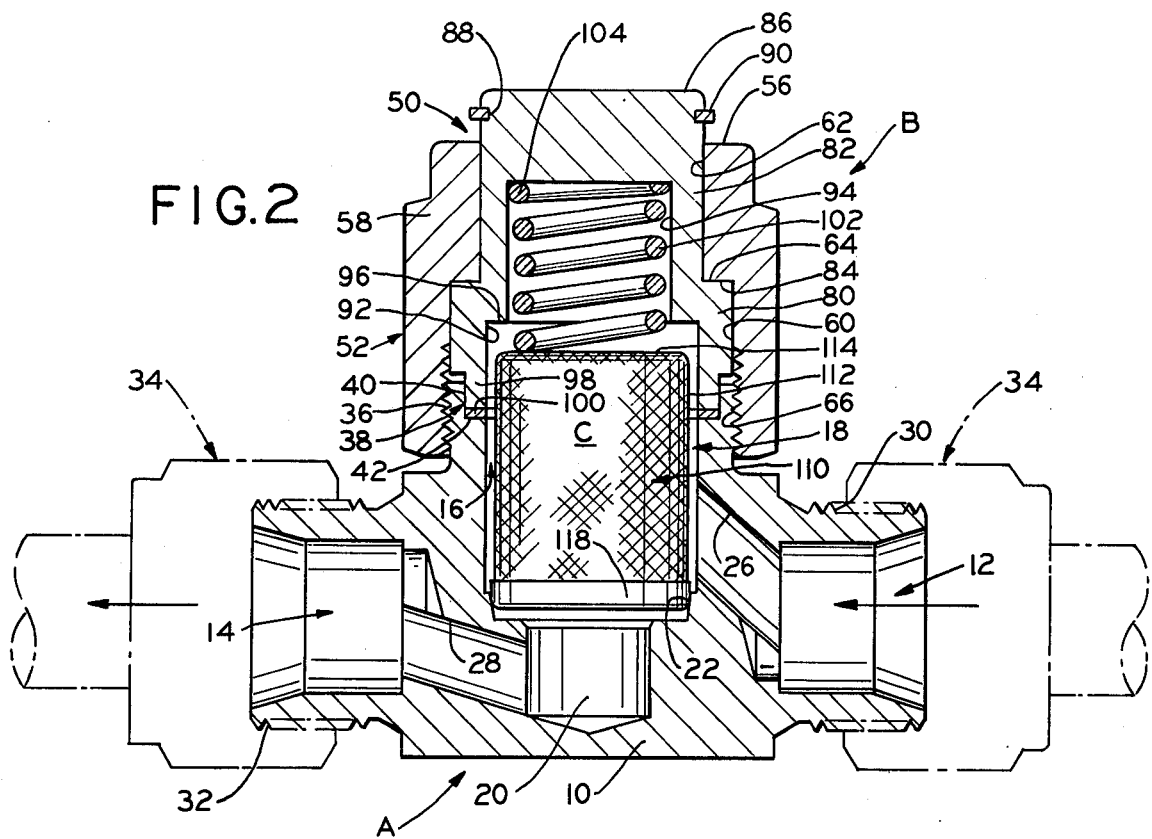
FIG. 2 is a cross-sectional view showing the subject fluid filter arrangement in an assembled condition.

More particularly, and with specific reference to FIGS. 1 and 2, filter body A is comprised of a body portion 10 having an inlet passage 12, an outlet passage 14 and a cylindrical fluid chamber 16. Chamber 16 has an open upper end 18 and a closed lower end 20 with a filter element seat area 22 disposed axially therealong between ends 18,20. An inner passageway 26 connects inlet passage 12 with chamber 16 on one side of seat area 22 and an inner passage 28 interconnects outlet passage 14 with chamber 16 on the other side of seat area 22.

Inlet and outlet passages 12,14 are defined by members protruding outwardly from body portion 10 having threaded areas 30,32 therein. These threaded areas are adapted to receive conventional tube or pipe fittings 34 for installation of the fluid filter in a known manner. Adjacent open upper end 18 of chamber 16 there is included a threaded area 36 adapted to threadedly receive bonnet assembly B as will become more readily apparent hereinafter. Disposed in the uppermost end of chamber 16 is a groove 38 defined by a side wall 40 and a bottom wall or shoulder 42. The purpose for this groove will also be described in greater detail hereinafter.

Seat area 22 comprises an area of the chamber which is tapered inwardly from the end thereof spaced closest to open end 18. The taper which has been found to yield the most advantageous results is one of 5° relative to the longitudinal axis of the chamber. In some applications with certain filter element structures, the seat area closely receives one end of the element in a close fitting engaging relationship so that as the bonnet assembly B is removed from the filter body, the filter element will be retained in position within chamber 16. It has been found that a taper of much greater than 5° will not retain the element in position as desired and that a taper of much less than 5° will grip the filter element too tightly and prevent its easy removal from the chamber. In other applications with other filter element structures, seat area 22 acts as an element guide and does not act to retain the element in position. The specifics of such operation will be discussed in greater detail hereinafter.

The preferred material for body portion 10 is either stainless steel or brass. These materials facilitate use of the overall structure in a wide variety of fluid environments and temperature ranges. However, other materials could also be advantageously employed within the scope and intent of the invention.

Bonnet assembly B is comprised of a bonnet 50, a bonnet nut 52 and a spring biasing means 54. Bonnet nut 52 has a generally cup-shaped configuration with a top wall 56 and a continuous side wall substantially comprised of a plurality of distinct sides 58. These sides provide convenient wrench flats for tightly mounting the bonnet assembly B on filter body A. Extending axially inward from one end of the bonnet nut toward the top wall is a first bore 60 and extending from the innermost end of bore 60 through top wall 56 is a second, smaller bore 62. Bores 60,62 are coaxial with one another, and with the bonnet nut. The interface of bores 60,62 defines a flange or shoulder 64. The outermost end of first bore 60 includes a threaded area 66 thereon adapted to threadedly engage threaded area 36 of body portion 10 in order to mount the bonnet assembly on the body to close open end 18 of chamber 16.

Bonnet 50 has a lower end portion generally designated 80 and an upper end portion generally designated 82. End portions 80,82 are dimensioned to be closely slidably received in first and second bores 60,62 respectively. The interface between end portions 80,82 defines a shoulder or flange 84 which may engage shoulder 64 to define one end limit for the desired relative axial movement permitted between the bonnet and bonnet nut. As shown in FIG. 2, upper end portion 82 has a length sufficient, when shoulders 64 and 84 are in engagement with each other, to extend through second bore 62 beyond top wall 56. Adjacent top end or wall 86 of upper end portion 82 is a circumferentially extending groove 88 which receives a conventional snap or lock ring 90. This snap ring acts as a stop for defining the other end limit of relative axial movement permitted between the bonnet and bonnet nut. The amount of such axial movement permitted is equal to the distance between shoulder 84 and ring 90 on the bonnet minus the distance between shoulder 84 and top wall 56 on the bonnet nut.

Extending axially inward from the bottom of lower end portion 80 is a first bore 92 and extending axially inward from the end of bore 92 is a second bore 94 which does not extend all the way through the bonnet to top wall 86. Bores 92,94 are coaxial and coaxial with the bonnet. Bore 92 and chamber 16 have substantially equal diameters. The interface between bores 92,94 defines a shoulder area 96. Protruding outwardly from lower end portion 80 is a lip area generally designated 98. As will be noted in FIG. 2, this lip is adapted to be closely received in groove 38 with an annular seal washer or gasket 100 received between the outermost end of the lip and bottom wall 42 of groove 38.

In the preferred arrangement here under discussion and as with body portion 10, bonnet 50 and bonnet nut 52 are constructed of stainless steel or brass. In a stainless steel construction, seal washer 100 is constructed from annealed stainless steel. In a brass construction, the seal washer is constructed from aluminum. Other materials could be employed without affecting the scope and intent of the present concept.

A coil spring generally designated 102 having a normally expanded condition is received and retained in bore 94. The preferred arrangement for retaining this spring in the bore is by enlarging the diameter of the last coil 104 so that at least that coil is received in the bore in a press fit manner. Thus, bonnet 50, bonnet nut 52 and spring biasing means 54 which comprise the overall bonnet assembly B are interconnected with each other in order that they may be removed from association with body portion 10 as a single unit. The benefits derived from such an arrangement will become apparent hereinafter.

In the preferred arrangement here under discussion, filter element or assembly C has a generally cup-shaped configuration 110 including a continuous side wall 112, a top wall 114, a bottom end 116 and a lower rim 118. Outside of the cup-shaped configuration, the specifics of the overall construction for the filter assembly do not form a particular part of the present invention. It should be noted, however, that the filter assembly C shown may be more particularly described as a strainer element of the type disclosed in the commonly assigned pending patent application Ser. No. 594,612, filed July 10, 1975. Other cup-shaped elements could also be advantageously employed without departing from the intent and scope of the present invention and such an alternative structure will be disclosed hereinafter.

With particular reference to FIG. 2, it will be seen that the strainer has a diameter slightly less than the diameter of chamber 16 and has a preferred length sufficient so that top wall 114 extends slightly beyond open end 18 when the element is properly located in seat area 22. As a result, an annular fluid flow area is defined between outside of side wall 112 and the side wall of chamber 16 and bore 92. Rim 118 is dimensioned so that its maximum outside diameter is at least slightly less than the maximum diameter of tapered seat area 22 and at least slightly greater than the seat area. This dimensional relationship along with the 5° taper of the seat area provides a slight force fit type relationship between rim 118 and the seat area in order that the filter element will be retained in the chamber when the bonnet assembly is removed from body portion 10. Because of the force fit between rim 18 and seat area 22, a fluid seal is created between the two surfaces so that fluid entering chamber 16 must pass through the filter assembly and cannot by-pass the assembly between the rim and the seat area.

Bonnet assembly B is installed on the housing by engagement between threads 66 and 36. At the same time, the lowermost end of spring 102 engages top wall 114 of the strainer element. As bonnet nut 52 is threadedly advanced on threads 36, shoulder 64 of the bonnet nut engages shoulder 84 of bonnet 50 to drive the bonnet downwardly toward the strainer element and thus compress spring 102. This, in turn, acts to increase the continuous biasing force urging the strainer element into a tight fitting relationship with seat area 22. Due to the rotational movement permitted between the bonnet and bonnet nut, the bonnet will remain stationary as the bonnet nut is threaded onto the filter body. This causes spring 102 to also remain stationary to prevent damage to the filter element. As the bonnet nut is fully threadedly advanced on threads 36, lip 98 engages seal washer or gasket 100 to create a fluid tight relationship between the bonnet assembly filter body.

Fluid entering the filter through inlet passage 12 and inner passage 26 passes to the fluid entrance chamber defined between chamber 16, bore 92, bore 94 and element side and top walls 112,114. The fluid then passes through the filter element, down to lower end 20 of passage 16 and then out of the filter body through inner passage 28 and outlet passage 14. In the preferred filter element arrangement, both side and top walls 112,114 permit fluid flow therethrough although it would be possible to construct the filter so that only one of these walls would permit through flow. Again, however, the specifics of these various filter element constructions do not form a part of the present invention.

When it is desired to gain access to chamber 16 for purposes of replacing, repairing or cleaning filter assembly C, it is first necessary to stop fluid flow through the filter. Once flow has been stopped, bonnet nut 52 may be unthreaded from threads 36. Again, because of the dimensional relationship between the bonnet and bonnet nut, the bonnet may remain stationary and will not, through spring 102, damage top wall 114 of the strainer element. Since the bonnet, bonnet nut and spring are all affixed to each other, the entire bonnet assembly may be removed from filter body 10 as a single unit once the bonnet nut has been removed from threads 36. It should be particularly noted that this last noted feature is of extreme importance when working with fluid filter installations located in particularly difficult areas, overhead areas or in blind areas which successfully eliminates the potential loss of individual component parts which would otherwise have to be replaced before the filter could be reassembled. Morever, this feature is also advantageous from the standpoint of facilitating ease of removal for the bonnet from the filter body in the event of corrosion or the like between the two components.

Once bonnet assembly B has been removed from the filter body, filter assembly C will be retained in position within chamber 16 by coaction between tapered seat area 22 and rim 118. While the 5° inward taper of the seat area is sufficient to retain the filter element in position, a slight canting of the element is normally sufficient to release it from retention by the seat area. A screwdriver of other small hand tool may be conveniently used for this purpose. Since the axial length of the filter element is such that it extends slightly outward from open end 18 of chamber 16, the strainer assembly may then be easily removed by hand from the chamber for replacement, maintenance or cleaning. Again, a 5° taper is deemed to be particularly important since a greater taper would be insufficient to retain the element in position once the bonnet assembly is removed and a smaller taper would cause the element to be too tightly retained and prevent easy removal. Retention of filter assembly C by the seat area is also important when the fluid filter is disposed in hard to get at areas, overhead areas and blind areas. Reassembly of the fluid filter is opposite to that hereinabove discussed with regard to disassembly.

Figure 3:
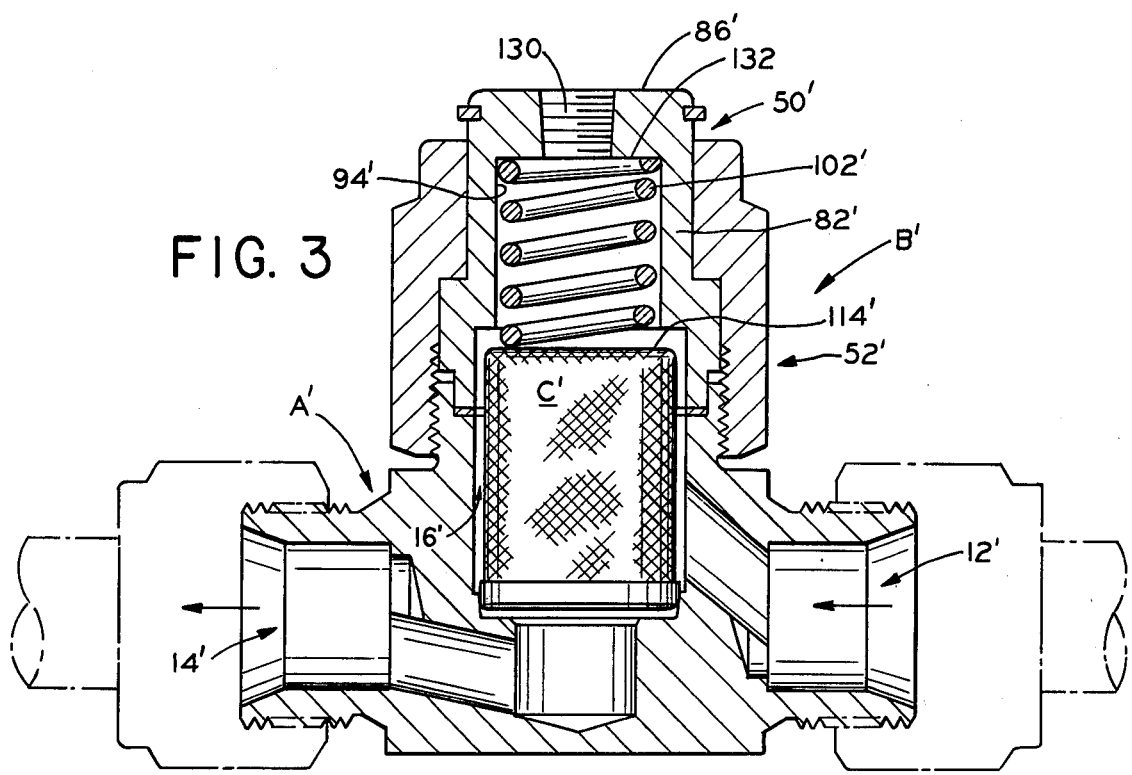
FIG. 3 is a view identical with FIG. 2 further including a by-pass port in the bonnet assembly.

FIG. 3 shows a slight modification of the arrangement shown in FIG. 2 wherein bonnet assembly B further includes a by-pass port. For ease of illustration and appreciation of the invention, like components are identified by like numerals with the inclusion of a primed (') suffix and new components are identified by new numerals. The by-pass port shown in FIG. 3 is comprised of a threaded orifice 130 extending from top walls 86' of bonnet 50' to bottom wall 132 of second bore 94'. This threaded orifice permits a check valve or line to be conveniently affixed to the fluid filter by conventional means. With this feature, when strainer assembly C' becomes clogged or otherwise inoperative, the bypass port could be opened by means of a pressure energized check valve to permit fluid flow to pass out of the filter assembly through orifice 130. Further, the check valve could easily be interconnected to an alarm or indicator light to show that fluid entering the filter is by-passing the filter assembly.

Figure 4:
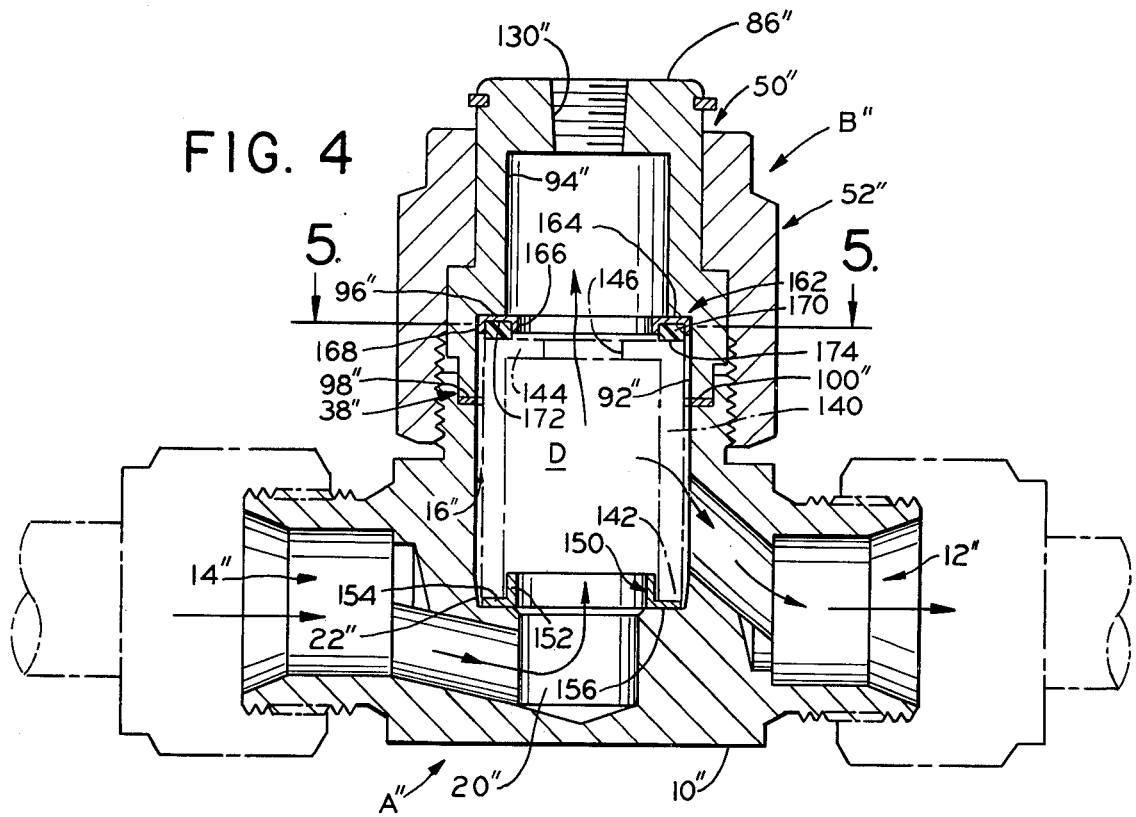
FIG. 4 is a cross-sectional view of an alternative arrangement for the subject fluid filter; and, FIG. 5 is a cross-sectional view taken along lines 5—5 of FIG. 4.
Figure 5:
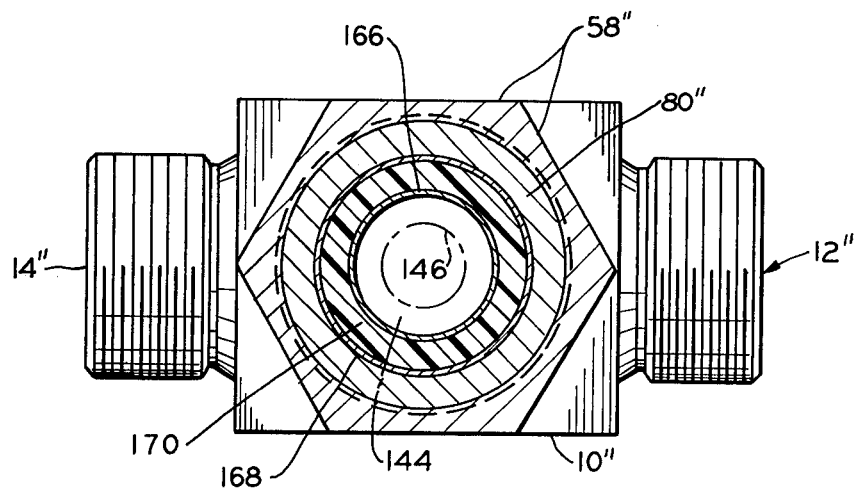

FIGS. 4 and 5 show still another structural modification utilizing the concepts of the subject invention. Here, the spring biasing means has been replaced by resilient annular biasing means, the dimensional relationship between the filter element and the seat area has been modified, a lower sealing washer or member has been added at the base of the seat area and fluid flow through the filter has been reversed. For ease of illustration in appreciating the modification, like components have like numerals including a double primed suffix (") and new components have new numerals.

In this modification, the particular filter assembly C shown in FIGS. 1 and 2 has been replaced by a filter assembly D of a different type and construction. This filter assembly uses a filter element which may be differentiated from the specific strainer element shown in FIGS. 1 and 2 in that its porposity is less than the porosity of the strainer element. Accordingly, and as shown in FIG. 4, filter assembly D is of a generally cup-shaped configuration having a continuous side wall 140, a lower end or edge 142, a top wall 144 and an opening 146 in the top wall. Typical of the general construction for such filter elements are elements as disclosed in the commonly assigned U.S. Pat. Nos. 3,240,342 and 3,240,346. These filter elements are of a sintered construction and are, therefore, subject to chipping or cracking at any impact exerted thereagainst. If a filter assembly D comprising a sintered construction was to have its lower end or edge closely received by seat area 22" in the same manner shown in FIGS. 1 and 2, some of the filter material could be chipped off or dislodged and contaminate fluid processed through the fluid filter.

For this reason, and when sintered filter elements are employed, the dimensional relationship between filter element lower edge 142 and tapered seat area 22" is slightly modified. This dimensional relationship is made such that lower end or edge 142 is not closely engaged or gripped by the seat area; rather, the seat area merely acts as a guide for the lower end. Therefore, and to seal lower edge 142 in chamber 16" for preventing fluid from by-passing the filtering operation, an annular lower seal generally designated 150 is utilized. This seal has a generally L-shaped configuration comprised of a side wall 152 and a bottom wall 154. Bottom wall 154 is received against and rests upon bottom wall 156 of seat area 22" with lower edge 142 received on seal bottom wall 154 and seal side wall 152 closely disposed against the inner surface of element side wall 140.

Shoulder 96" disposed at the interface between bores 92" and 94" acts as the receiving area for a biasing means generally designated 162 which replaces the spring biasing means particularly shown FIGS. 1 and 2. This biasing means is comprised of an annular U-shaped ring 164 having an inner side wall 166 and an outer side wall 168. Closely received between side walls 166,168 and extending outwardly from the distal ends thereof is a resilient annular biasing ring 170. Inner face 172 of this ring is received against the bottom wall of ring 164 and outer face 174 is adapted to engage top wall 144 of the filter element.

In this arrangement, and as bonnet nut 52" is threadedly advanced onto filter body 10", shoulder 96" forces biasing means 162 toward top wall 144 of the filter element so that outer face 174 will engage wall 144. As the bonnet nut is further tightened on the filter body, biasing ring 170 will be slightly compressed to assure a good sealing relationship against element top wall 144 to prevent fluid from passing therebetween. As bonnet nut 52" is further advanced onto the filter body biasing means 162 forces lower edge 142 of the filter element to closely engage bottom wall 154 of the lower seal to prevent fluid from passing beneath the element lower edge. Simultaneous with such bonnet nut tightening, lip 98" engages seal washer or ring 100" in groove 38" to provide a fluid seal between the bonnet and filter body. Thus, in this arrangement, actual filtering occurs through the side wall of the filter element only.

In operation of this modified structure described above, original fluid outlet 14" becomes the fluid inlet and original fluid inlet 12" now becomes the fluid outlet. As shown by the arrows in FIG. 4, fluid entering inlet 14" passes to closed lower end 20" of chamber 16" and then passes upwardly on the inside of filter assembly D. Fluid is then filtered through this element from inside out to the annular fluid chamber defined between the side wall of chamber 16" and the outside of side wall 140 and then outwardly of the filter body through outlet 12". Fluid may also pass outwardly of element top wall 144 through opening 146 but this fluid will not pass outwardly from the filter body because of the blockage created on top wall 144 by biasing ring 170.

The structure shown in FIGS. 4 and 5 also contemplates the use of a by-pass port generally shown as threaded orifice 130". Here, again, if the filter element becomes clogged or otherwise inoperable, fluid passing into the filter assembly through inlet passage 14" may pass outwardly from the assembly through by-pass port 130" which may be conveniently controlled by an appropriate check valve or the like as discussed hereinabove. Assembly and disassembly of this modified embodiment is substantially the same as previously described with reference to FIGS. 1 and 2. If desired, it would also be possible to permanently retain biasing means 162 on shoulder 96" by convenient securing means.

In the preferred arrangement for this modified construction, lower seal 150 and resilient annular washer 170 are constructed from Teflon and cup-shaped ring 164 is constructed from stainless steel. However, in both instances, other materials could be advantageously employed without departing from the intent or scope of the present invention.

It would also be possible to adopt a filter assembly C of the general type disclosed with particular reference to FIGS. 1 and 2 with the modified fluid filter disclosed with reference to FIGS. 4 and 5. In such an arrangement, lower seal 150 would be eliminated from use since the filter element would be closely received in seal area 22". As should be appreciated, other generally cup-shaped filter assemblies having different filtering or straining characteristics could also be advantageously employed without departing from the concepts of the present fluid filter structure.

The invention has been described with reference to the preferred embodiment. Obviously, modifications and alterations will occur to others upon a reading and understanding of the specification. It is our intention to include all such modifications and alterations insofar as they come within the scope of the appended claims or the equivalents thereof.

Having thus described our invention, we now claim:

1. A fluid filter comprising:
   a filter body including a fluid chamber therein having an open outer end and a seat area spaced axially therealong, a fluid inlet communicating with said chamber on one side of said seat area and a fluid outlet communicating with said chamber on the other side of said seat area;
   a fluid filter element disposed in said chamber with one end thereof communicating with said seat area;
   a bonnet assembly adapted to close said chamber open end, said assembly being releasably retained on said filter body and comprising a bonnet and bonnet nut operably associated with each other so as to permit rotational and axial movement therebetween;
   means for continuously urging said filter element into said seat area; and,
   a sealing ring disposed between said bonnet and filter body for sealing the interconnection of said bonnet assembly on said filter body in a fluid tight manner.

2. The fluid filter as defined in claim 1 wherein said bonnet nut is generally cup-shaped and includes a top wall having an opening therethrough, said bonnet being received in said cup-shaped bonnet nut with a portion of said bonnet extending through said opening and retained therein such that said bonnet nut and bonnet may be rotationally and axially moved between defined limits relative to each other, said bonnet assembly being releasably retained on said filter body by threaded engagement between said bonnet nut and said body.

3. The fluid filter as defined in claim 2 wherein said bonnet nut includes a shoulder on the inside thereof which cooperates with a shoulder on the outside surface of said bonnet to provide a driving surface between the bonnet and bonnet nut and which defines one limit of relative axial movement between said bonnet and bonnet nut, said bonnet portion and said bonnet nut top wall including cooperating means which defines the other limit of relative axial movement.

4. The fluid filter as defined in claim 3 wherein said cooperating means comprises a lock ring received on said bonnet portion which cooperates with the outside of said bonnet nut top wall.

5. The fluid filter as defined in claim 1 wherein said urging means comprises spring biasing means having one end retained in said bonnet assembly and the other end adapted to engage said filter element for continuously urging said filter element toward said seat area, said bonnet, bonnet nut and spring biasing means being removable from said filter body as a single unit.

6. The fluid filter as defined in claim 1 wherein said urging means comprises resilient biasing means disposed between said bonnet and said filter element adapted to continuously urge said filter element toward said seat area.

7. The fluid filter as defined in claim 6 further including a resilient seal member disposed in said seat and adapted to sealingly engage said one end of said filter element.

8. The fluid filter as defined in claim 7 wherein both said resilient biasing means and resilient seal member are generally annular and said seal member has a generally L-shaped cross-section, one side of said L-shaped configuration being received in said seat area beneath said filter element one end and the other side of said L-shaped configuration adapted to be received inside of said filter element.

9. The fluid filter as defined in claim 1 wherein said filter body includes a seal ring receiving shoulder adjacent said open end with said sealing ring dimensioned to be received on said receiving shoulder, said bonnet including a seal engaging lip adapted to closely communicate with said shoulder whereby said sealing ring will be closely retained between said receiving shoulder and said seal engaging lip.

10. The fluid filter as defined in claim 1 wherein said seat area is defined by a tapered area in said chamber tapering inwardly from that end thereof disposed closest to the open outer end.

11. The fluid filter as defined in claim 10 wherein said taper is approximately 5° relative to the longitudinal center line of said chamber.

12. The fluid filter as defined in claim 10 wherein said one end of said filter element is adapted to be closely received in and engage the side wall of said seat area, said filter element being retained in said chamber by said seat area when said bonnet assembly has been removed from association with said filter body.

13. The fluid filter as defined in claim 1 wherein said bonnet assembly includes a by-pass port communicating with said chamber.

14. The fluid filter as defined in claim 13 wherein said by-pass port is disposed in said bonnet generally coaxial with the longitudinal axis of said chamber.

15. In a fluid filter of the type having a body including an inlet passage and an outlet passage communicating with an open ended chamber having a filter element disposed therein with said open end being closed by a bonnet assembly releasably mounted to said body, the improvement comprising:
   said bonnet assembly being comprised of a bonnet and a bonnet nut interconnected with each other so as to permit installation and removal of said assembly on said filter body as a single unit, said bonnet nut being generally cup-shaped including a top wall having an opening therethrough and being threadedly received on said filter body over said chamber open end, said bonnet being received in said generally cup-shaped bonnet nut with a portion thereof extending through said opening and retained therein such that said bonnet nut and bonnet may be axially moved between defined limits as well a rotationally moved relative to each other, said bonnet nut further including a shoulder on the inside thereof which cooperates with a shoulder on the outside surface of said bonnet to provide a driving surface between the bonnet and bonnet nut and define one limit of relative axial movement between said bonnet and bonnet nut with said bonnet portion and bonnet nut top wall including cooperating means which defines the other limit of relative axial movement.

16. The improvement as defined in claim 15 wherein said cooperating means comprises a lock ring received on said bonnet portion which cooperates with the outside of said bonnet nut top wall.

17. The improvement as defined in claim 15 wherein said fluid filter further includes biasing means for continuously urging said filter element toward a seated position in said chamber.

18. The improvement as defined in claim 17 wherein said biasing means comprises a coil spring with one end of said spring being affixed to said bonnet and the other end thereof adapted to engage said filter element, said coil spring comprising a portion of said bonnet assembly which may be installed and removed from said filter body as a single unit.

19. The improvement as defined in claim 17 wherein said biasing means comprises a resilient annular biasing member disposed between said bonnet and filter element.

20. The improvement as defined in claim 15 wherein said bonnet assembly further includes a by-pass port communicating with said chamber.

21. The improvement as defined in claim 20 wherein said by-pass port is disposed in said bonnet generally coaxial with the longitudinal axis of said chamber.

22. The improvement as defined in claim 15 wherein said chamber further includes a seat area spaced axially therealong adapted to receive said filter element one end, said seat area being defined by a tapered area in said chamber tapering inwardly from that end thereof spaced closest to said chamber open end.

23. The improvement as defined in claim 22 wherein said taper is approximately 5° relative to the longitudinal center line of said chamber.

24. The improvement as defined in claim 23 wherein said one end of said filter element is adapted to be closely received in and engage the side wall of said seat area, said filter element being retained in said chamber by said seat area when said bonnet assembly is removed from association with said filter body.

25. A fluid filter comprising:
a filter body including a fluid chamber therein having an open outer end and a set area spaced axially therealong, a fluid inlet communicating with said chamber on one side of said seat area and a fluid outlet communicating with said chamber on the other side of said seat area;
a fluid filter element disposed in said chamber with one end thereof communicating with said seat area;
a bonnet assembly adapted to close said chamber open end, said assembly being releasably retained on said filter body and comprising a bonnet and bonnet nut operably associated with each other so as to permit rotational and axial movement therebetween and installation and removal of said assembly on said filter body as a single unit, said bonnet nut being generally cup-shaped including a top wall having an opening therethrough and being threadedly received on said filter body cover over said chamber open end, said bonnet being received in said generally cup-shaped bonnet nut with a portion thereof extending through said opening and retained therein such that said bonnet nut and bonnet may be axially moved between defined limits as well as rotationally moved relative to each other, said bonnet nut further including a shoulder on the inside thereof which cooperates with a shoulder on the outside surface of said bonnet to provide a driving surface between the bonnet and bonnet nut and define one limit of relative axial movement between said bonnet and bonnet nut with said bonnet portion and bonnet nut top wall including cooperating means which defines the other limit of relative axial movement;
means for continuously urging said filter element into said seat area; and,
means for sealing the interconnection of said bonnet assembly on said filter body in a fluid tight manner.

* * * * *